US009995426B2

(12) United States Patent
Mackenzie et al.

(10) Patent No.: US 9,995,426 B2
(45) Date of Patent: *Jun. 12, 2018

(54) FURNITURE SWIVEL AND FURNITURE INCLUDING THE SAME

(71) Applicant: C.R. Plastic Products Inc., Stratford (CA)

(72) Inventors: John Mackenzie, Sebringville (CA); Robert Knott, Stratford (CA); Lenze Elzinga, Stratford (CA); Bradley Girvin, Stratford (CA)

(73) Assignee: C.R. PLASTIC PRODUCTS INC., Stratford (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/436,228

(22) Filed: Feb. 17, 2017

(65) Prior Publication Data
US 2017/0159874 A1    Jun. 8, 2017

Related U.S. Application Data

(63) Continuation of application No. 14/669,850, filed on Mar. 26, 2015, now Pat. No. 9,574,704.

(51) Int. Cl.
| *A47C 1/00* | (2006.01) |
| *F16M 11/08* | (2006.01) |
| *A47C 3/18* | (2006.01) |
| *A47B 11/00* | (2006.01) |
| *A47B 13/08* | (2006.01) |

(52) U.S. Cl.
CPC ............. *F16M 11/08* (2013.01); *A47B 11/00* (2013.01); *A47B 13/081* (2013.01); *A47B 13/088* (2013.01); *A47C 3/18* (2013.01)

(58) Field of Classification Search
CPC ......... A47C 3/185; A47C 3/18; A47C 3/0255; F16M 11/08; A47B 11/00; A47B 13/088
USPC ........................................ 297/344.21, 256.12
See application file for complete search history.

(56) References Cited

U.S. PATENT DOCUMENTS

| 4,226,398 A | * | 10/1980 | Freber | ...................... A47C 3/18 108/139 |
| 5,779,309 A | * | 7/1998 | Lu | ............................ A47C 3/18 248/349.1 |
| 6,015,188 A | * | 1/2000 | Yundt | ...................... A47C 3/16 297/242 |
| 6,890,033 B1 | * | 5/2005 | Casella | .................... A47C 1/14 297/344.21 |
| 8,544,809 B1 | * | 10/2013 | Laurita | .................... A47C 3/18 248/346.01 |

(Continued)

*Primary Examiner* — Chi Q Nguyen
(74) *Attorney, Agent, or Firm* — Bereskin & Parr LLP

(57) ABSTRACT

A furniture swivel for rotatably coupling first and second furniture components is disclosed. The furniture swivel includes a base, a rotor, and a retainer. The base may have a lower end for connecting to a first furniture component and an upper end including a planar base bearing surface. The rotor may have an upper end having a first portion for connecting to a second furniture component, and a lower end including a planar rotor bearing surface in sliding contact with the base bearing surface to form a plane bearing absent rolling elements for supporting the rotor and the first furniture component on the base. The retainer may be coupled to the base for substantially inhibiting translation of the rotor relative to the base.

19 Claims, 11 Drawing Sheets

(56) References Cited

U.S. PATENT DOCUMENTS

| | | | |
|---|---|---|---|
| 8,998,326 B2 * | 4/2015 | DeCraene | B60N 2/14 296/65.06 |
| 9,574,704 B2 * | 2/2017 | Mackenzie | F16M 11/08 |
| 2011/0109135 A1 * | 5/2011 | Davis, Jr. | A47C 3/18 297/217.4 |
| 2014/0292053 A1 * | 10/2014 | Chou | A47C 3/185 297/344.21 |

* cited by examiner

FURNITURE SWIVEL AND FURNITURE INCLUDING THE SAME

RELATED APPLICATIONS

This application is a continuation of U.S. patent application Ser. No. 14/669,850, filed Mar. 26, 2015 and entitled FURNITURE SWIVEL AND FURNITURE INCLUDING THE SAME (now U.S. Pat. No. 9,574,704, which issued on Feb. 21, 2017), the entire contents of which are hereby incorporated by reference herein for all purposes.

FIELD

This disclosure relates to the field of rotatable couplings between furniture components, and more particularly to furniture swivels and furniture including the same.

INTRODUCTION

A furniture swivel is a swivel adapted for rotatably coupling furniture components. For example, a chair may include a seat rotatably coupled to legs by a furniture swivel to allow the seat to rotate relative to the legs of the chair. Typically, a furniture swivel includes a roller bearing with rolling elements which provide the rotary capability of the swivel. However, roller bearings can be complicated assemblies with many component parts that can be expensive to manufacture and difficult to maintain.

SUMMARY

In a first aspect, a furniture swivel for rotatably coupling first and second furniture components is provided. The furniture swivel may include a base, a rotor, and a retainer. The base may have a base upper end opposite a base lower end. The base lower end may connect to a first furniture component and the base upper end may include a planar base bearing surface. The rotor may have a rotor upper end opposite a rotor lower end and the rotor upper end may have a first portion and a second portion. The first portion may connect to a second furniture component. The rotor lower end may include a planar rotor bearing surface in sliding contact with the base bearing surface to form a plane bearing absent rolling elements for supporting the rotor and the first furniture component on the base. The retainer may be coupled to the base. The retainer may have a retainer upper end opposite a retainer lower end and an aperture through the retainer upper and lower ends. The first portion of the rotor upper end may extend through the aperture to above the retainer upper end. The retainer lower end may overlap the second portion of the rotor upper end for substantially inhibiting translation of the rotor relative to the base.

In some embodiments, at least the base bearing surface and the rotor bearing surface may be made of plastic to form a plastic-on-plastic plane bearing.

In some embodiments, one or both of the base bearing surface and the rotor bearing surface may have a surface grain which provides the plane bearing with a Percent Contact Area of less than 80%.

In some embodiments, one or both of the base bearing surface and the rotor bearing surface may have a surface grain which provides the plane bearing with a Percent Contact Area of less than 65%.

In some embodiments, the surface roughness of one or both of the base bearing surface and the rotor bearing surface is formed by injection molding.

In some embodiments, the furniture swivel may further comprise lubricant between the base and rotor bearing surfaces.

In some embodiments, one or both of the base bearing surface and the rotor bearing surface may be made of plastic impregnated with lubricant.

In some embodiments, the rotor may comprise a central portion and a flange. The flange may include the second portion of the rotor upper end and surround the central portion. The central portion may include the first portion of the rotor upper end and extending above the flange.

In some embodiments, the central portion of the rotor may extend through the aperture in the retainer. The retainer may further comprise a bore extending from the retainer lower end toward the retainer upper end, and the flange may be received in the bore.

In some embodiments, the central portion, the flange, the aperture, and the bore may be circular in cross-section.

In some embodiments, both of a diameter of the central portion and a diameter of the aperture may be less than both of a diameter of the flange and a diameter of bore, and axes of the central portion, the flange, the aperture, and the bore may be collinear.

In some embodiments, the retainer may form a seal with the base, the seal surrounding rotor.

In some embodiments, the retainer may be made of plastic, the base may be made of plastic, the retainer may be fastened to the base by a plurality of mechanical fasteners, and the seal may be formed by compliance of the retainer plastic and the base plastic where the retainer is pressed against the base.

In some embodiments, the base lower end may further comprise at least one depression for seating an end of the first furniture component, and at least one aperture may be aligned with each depression for receiving a fastener.

In some embodiments, the first furniture component may be integrally formed with the base.

In some embodiments, the second furniture component may be integrally formed with the rotor.

According to another aspect, an article of furniture is provided. The article of furniture may comprise first and second furniture components, and a furniture swivel for rotatably coupling the first furniture component to the second furniture component whereby the second furniture component can rotate about a vertical axis relative to the first furniture component. The furniture swivel may include a base having a base, a rotor, and a retainer. The base may include a base upper end opposite a base lower end. The base lower end may connect to the first furniture component, and the base upper end may include a planar base bearing surface. The rotor may have a rotor upper end opposite a rotor lower end. The rotor upper end may be connected to the second furniture component. The rotor lower end may include a planar rotor bearing surface in sliding contact with the base bearing surface to form a plane bearing absent rolling elements for supporting the rotor and the second furniture component on the first furniture component. The retainer may be coupled to the base and overlap at least a portion of the rotor upper end for inhibiting translation of the rotor relative to the base.

In some embodiments, the article is a chair. The second furniture component may be a seat for supporting a user in a seated posture and the first furniture component may be a support for supporting the seat on a horizontal surface.

In another aspect, a turntable is provided. The turntable may comprise a tabletop and a furniture swivel for rotatably supporting the tabletop on a horizontal surface whereby the tabletop can rotate about a vertical axis relative to the horizontal surface. The furniture swivel may include a base, a rotor, and a retainer. The base may have a base upper end opposite a base lower end, the base lower end for resting on the horizontal surface. The base upper end may include a planar base bearing surface. The rotor may have a rotor upper end opposite a rotor lower end. The rotor upper end may be connected to the tabletop. The rotor lower end may include a planar rotor bearing surface in sliding contact with the base bearing surface to form a plane bearing absent rolling elements for supporting the rotor and the tabletop on the horizontal surface. The retainer may be coupled to the base and overlapping at least a portion of the rotor upper end for inhibiting translation of the rotor relative to the base.

In some embodiments, a width of the tabletop may be greater than a width of the furniture swivel, and the furniture swivel may be entirely positioned beneath the tabletop.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected directly in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Figure 1:
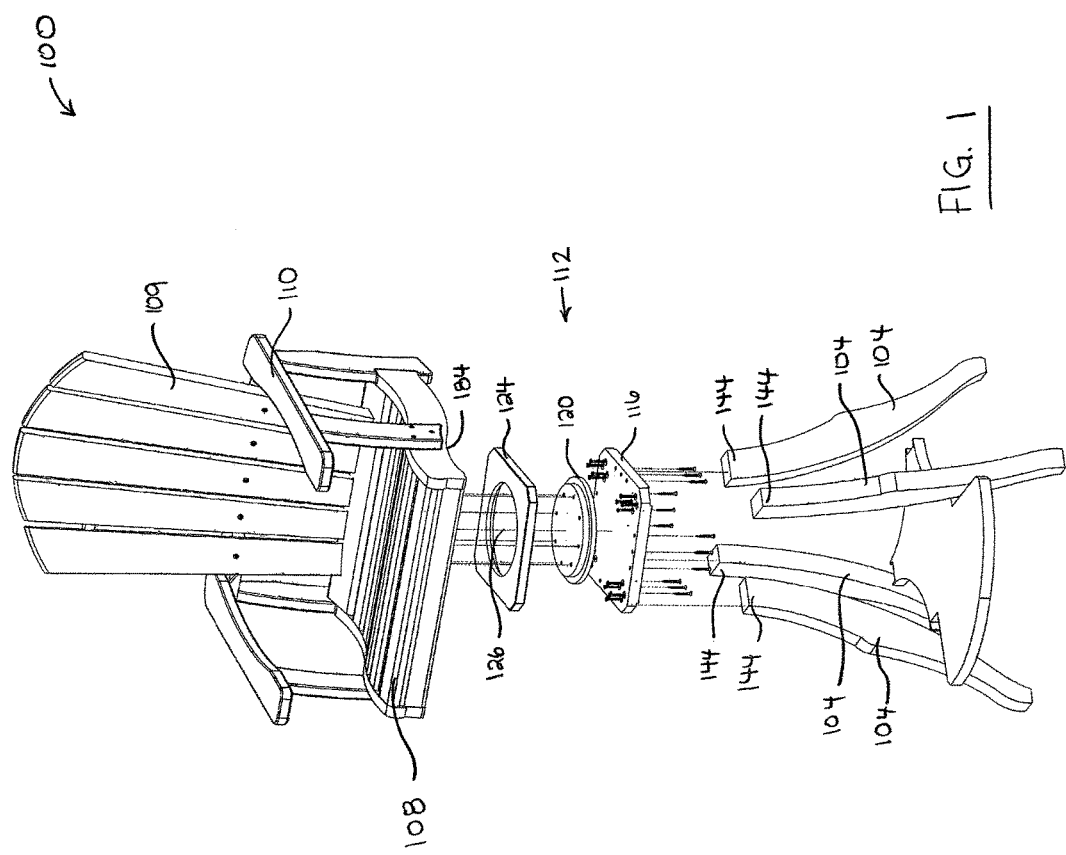
FIG. 1 is an exploded view of a chair including a furniture swivel in accordance with at least one embodiment.

In accordance with various aspects, an article of furniture may be composed of a plurality of furniture components and a furniture swivel for rotatably coupling at least two of these furniture components. Thus, the furniture swivel allows the two furniture components to be rotated with respect to each other. Reference is first made to FIG. 1, which shows an article of furniture (a chair) 100, having first furniture components (legs) 104, a second furniture component (a seat) 108, and a furniture swivel 112 for rotatably coupling chair 100 to legs 104. Seat 108 provides support for a user in a seated posture, and legs 104 are a support for supporting the seat on a horizontal surface.

Chair 100 may include any seat known in the art for supporting a user in a seated posture. In the illustrated example, chair 100 includes a backrest 109 and armrests 110 connected to seat 108. In alternative embodiments, chair 100 may be absent armrests 110 and/or backrest 109 as in a typical stool (another type of chair). Further, chair 100 may include any suitable support for supporting seat 108 on a horizontal surface (e.g. floor or ground surface). For example, chair 100 may include four legs 104 as shown, or fewer or greater than four legs 104. In some embodiments, chair 100 may include a monolithic post as a support connected to seat 108 in place of legs 104.

It will be appreciated that although furniture swivel 112 is described as rotatably coupling a seat and support of a chair, in alternative embodiments, furniture swivel 112 may rotatably couple any two furniture components of an article of furniture, such as for example the tabletop and support of a table.

Figure 2:
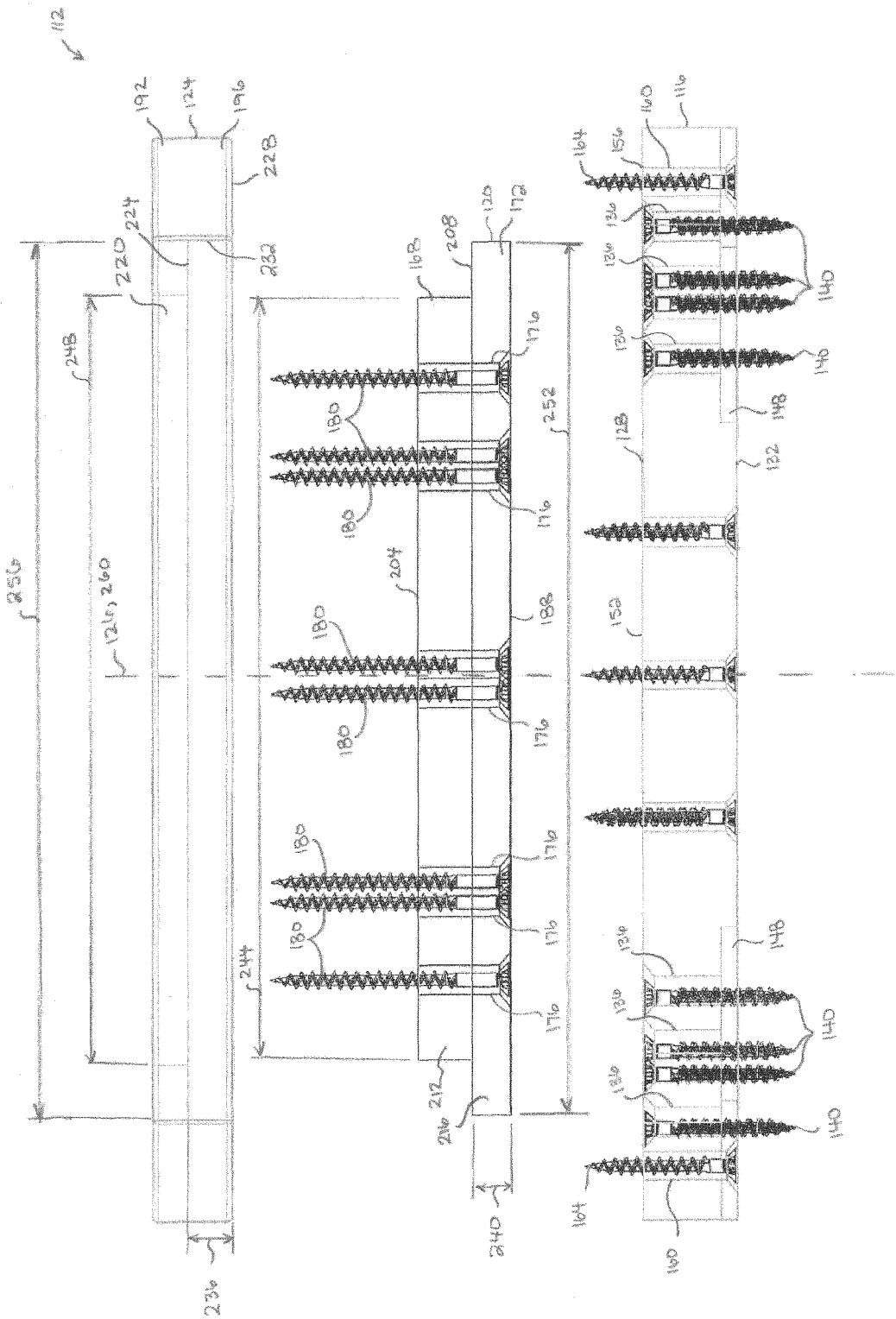
FIG. 2 is an exploded side elevation view of the furniture swivel of FIG. 1 including a base, rotor, and retainer.

Additional reference is now made to FIG. 2, which shows furniture swivel 112 in accordance with at least one embodiment. As exemplified, furniture swivel 112 includes a base 116, a rotor 120, and a retainer 124. Base 116 may be fastened to legs 104, rotor 120 may be fastened to seat 108, and retainer 124 may hold rotor 120 in contact with base 116. Preferably, base 116 and rotor 120 interface at mutual contact surfaces which exhibit relatively low friction so that rotor 120 can rotate with respect to base 116 about an axis 126 normal to the horizontal surface. Advantageously, furniture swivel 112 is absent any rolling elements (e.g. ball bearings or the like). Further, rotor 120 is preferably positioned vertically above base 116 so that base 116 supports the weight of rotor 120 and chair 100.

Figure 3B:
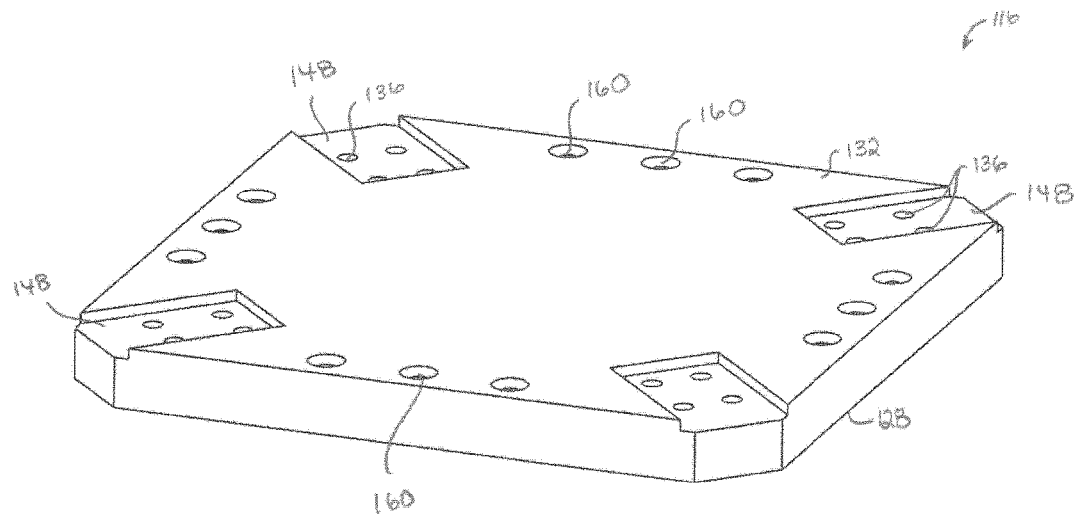
FIGS. 3A and 3B are top and bottom perspective views, respectively, of the base of FIG. 2.
Figure 3A:
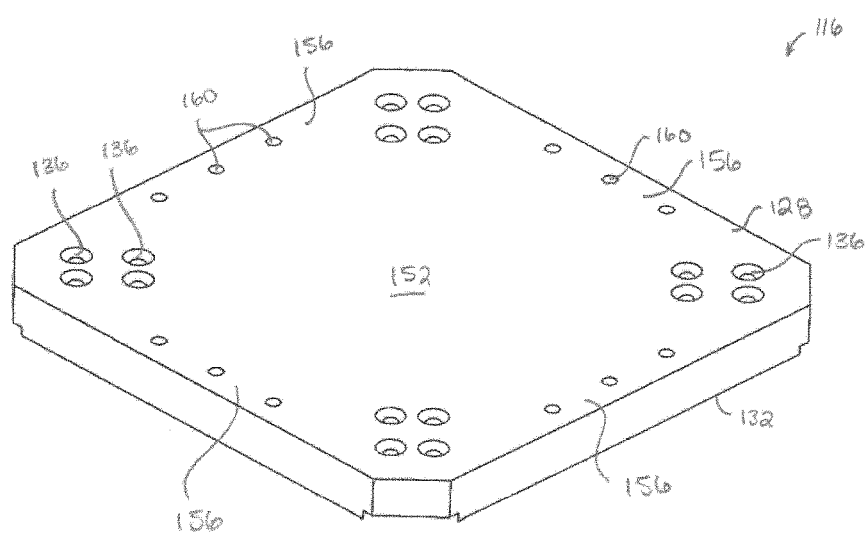

Additional reference is now made to FIGS. 3A-3B, which show base 116 of furniture swivel 112 in accordance with at least one embodiment. As exemplified, base 116 may include an upper end 128 opposite a lower end 132. In some embodiments, base lower end 132 may be connected to legs 104. It will be appreciated that legs 104 may be connected to base lower end 132 in any suitable fashion, such as by mechanical fasteners (e.g. screws, rivets, nails, or press-fit dowels), adhesives (e.g. glue or epoxy), an interference fit, threads, or by integrally forming legs 104 with base 116 for example. Preferably, legs 104 are rigidly connected to base 116. In some embodiment, legs 104 are directly connected to base 116. In the illustrated example, base 116 includes apertures 136 for receiving mechanical fasteners 140 which hold upper end 144 of legs 104 rigidly in contact with base lower end 132. Base lower end 132 may be substantially planar, or contoured in any suitable fashion. As exemplified, base lower end 132 may include depressions 148 for seating legs upper end 144. The illustrated example also shows that apertures 136 may be aligned with depressions 148 for guiding fasteners into legs 104.

In alternative embodiments, base lower end 132 may not include depressions 148. In some alternative embodiments, legs 104 may be connected to another portion of base 116, such as base upper end 128.

Still referring to FIGS. 1, 2, and 3A-3B, base upper end 128 may include a bearing surface 152 for supporting furniture swivel 112. Preferably, base bearing surface 152 is planar and provides sliding support for furniture swivel 112 to permit furniture swivel 112 to move (e.g. rotate) when supported on base bearing surface 152. Base bearing surface 152 may constitute the entire upper face of base upper end 128 or a portion thereof. For example, base upper end 128 may further include a connecting portion 156, outside the base bearing surface 152, where base 116 may be connected to retainer 124 as described in more detail below. As exemplified, the base connecting portion 156 may surround base bearing surface 152. Depending on the manner of connection between base connecting portion 156 and retainer 124, base connecting portion 156 may include apertures 160 for fasteners 164 which join base 116 to retainer 124.

Figure 4B:
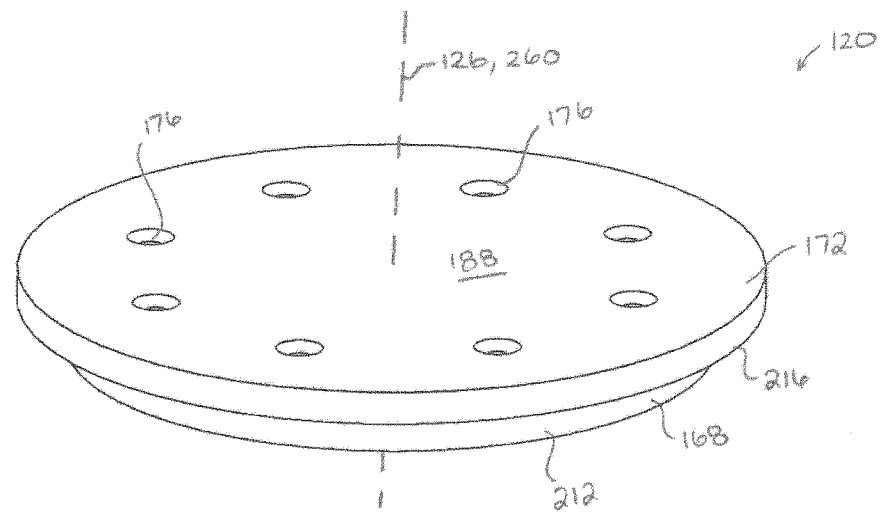
FIGS. 4A and 4B are top and bottom perspective views, respectively, of the rotor of FIG. 2.
Figure 4A:
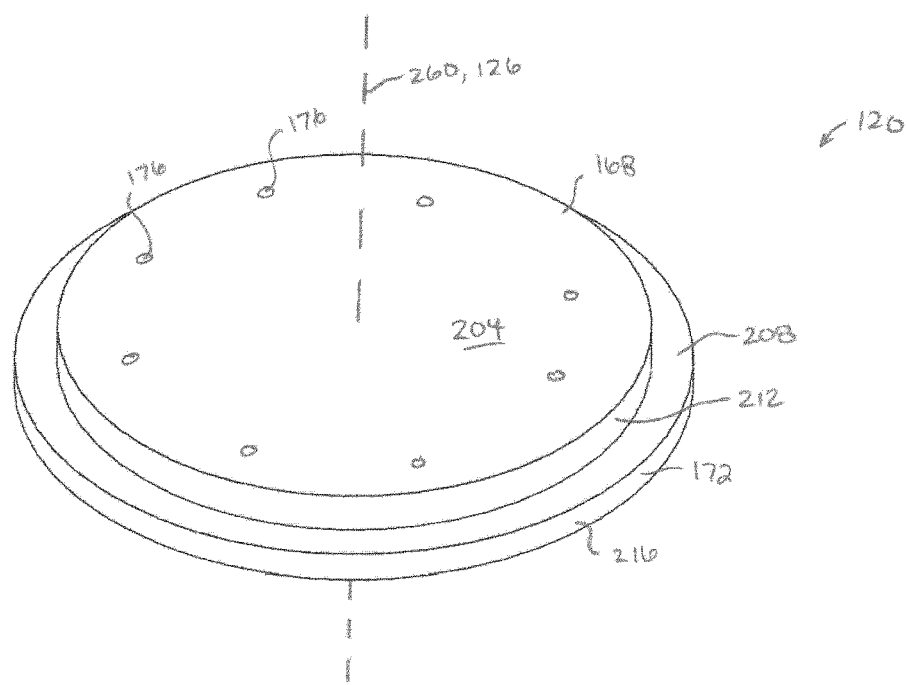

Additional reference is now made to FIGS. 4A-4B, which show rotor 120 of furniture swivel 112 in accordance with at least one embodiment. As exemplified, rotor 120 may include an upper end 168 opposite a lower end 172. In some embodiments, rotor upper end 168 may be connected to seat 108. It will be appreciated that seat 108 may be connected to rotor upper end 168 in any suitable fashion, such as by mechanical fasteners (e.g. screws, rivets, nails, or press-fit dowels), adhesives (e.g. glue or epoxy), an interference fit, threads, or by integrally forming rotor 120 with seat 108 for example. Preferably, seat 108 is rigidly connected to rotor 120. In some embodiments, seat 108 is directly connected to rotor 120. In the illustrated example, rotor 120 includes apertures 176 for receiving mechanical fasteners 180 which hold a lower end 184 of seat 108 rigidly in contact with rotor upper end 168 of rotor 120.

Still referring to FIGS. 1, 2, 3A-3B, and 4A-4B, rotor lower end 172 may include a rotor bearing surface 188. Preferably, rotor bearing surface 188 is a planar surface which forms a plane bearing when in contact with base bearing surface 152 for supporting rotor 120 and seat 108 on base 116. This may permit furniture swivel 112 to rotatably couple furniture components without rolling elements (e.g. ball bearings and the like). For example, rotor lower end 172 may be positioned atop base 116 with rotor lower end 172 facing base upper end 128, whereby rotor bearing surface 188 makes sliding contact with base bearing surface 152.

Preferably, retainer 124 holds rotor 120 and base 116 together. For example, retainer 124 may hold rotor 120 in contact with base 116 and substantially inhibit rotor 120 from translating relative to base 116. This may substantially constrain the sliding of rotor 120 on base 116 to rotational movements. In turn, this may substantially inhibit rotor bearing surface 188 from sliding off of base bearing surface 152. As used herein and in the claims, retainer 124 is said to "substantially inhibit" rotor 120 from translating relative to base 116 even where manufacturing tolerances permit minor translations (e.g. less than 1 mm) of rotor 120 relative to base 116.

Figure 5B:
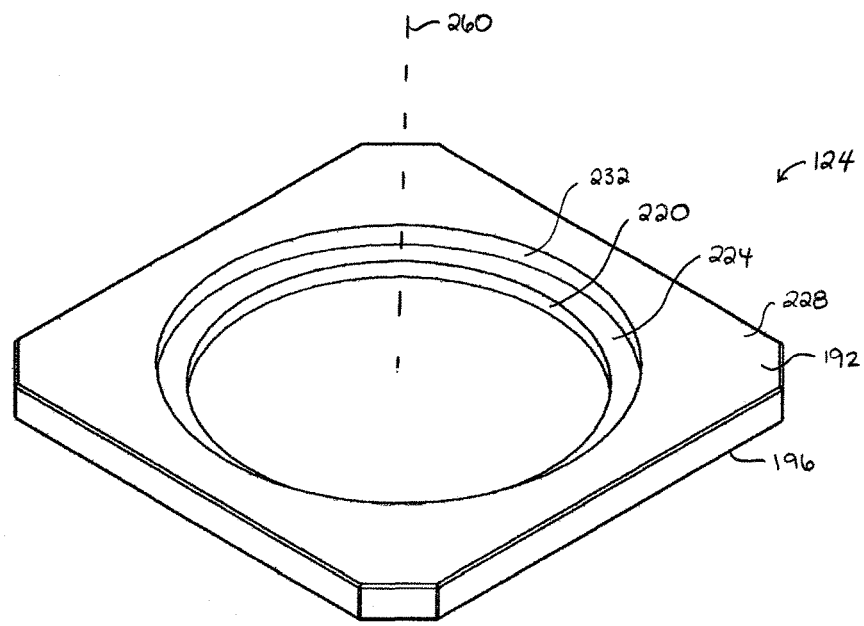
FIGS. 5A and 5B are top and bottom perspective views, respectively, of the retainer of FIG. 2.
Figure 5A:
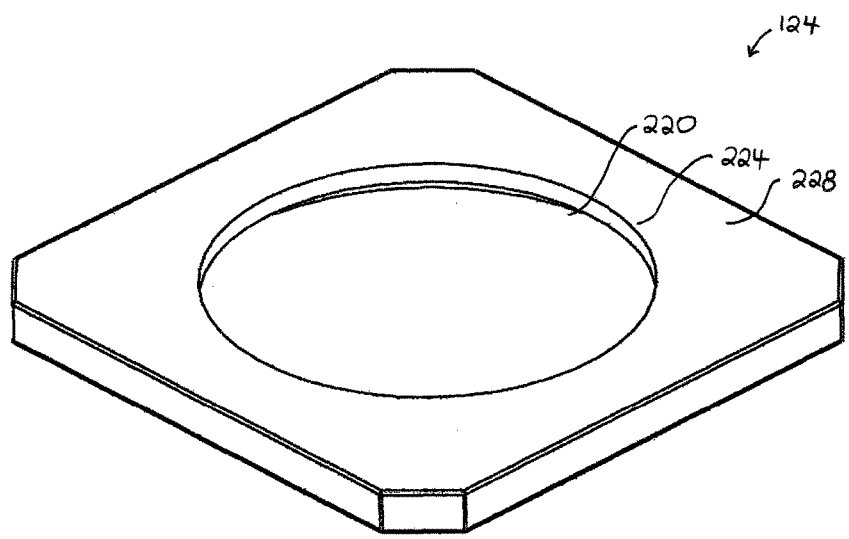

Additional reference is now made to FIGS. 5A-5B, which show retainer 124 of furniture swivel 112 in accordance with at least one embodiment. As exemplified, retainer 124 may include an upper end 192 opposite a lower end 196. In some embodiments, lower end 196 may be connected to base 116 for retaining rotor 120 on base 116. As discussed above, retainer 124 may be connected to base 116 in any suitable fashion, such as by mechanical fasteners (e.g. screws, rivets, nails, or press-fit dowels), adhesives (e.g. glue or epoxy), an interference fit, threads, or by integrally forming base 116 with retainer 124, for example. Optionally, retainer 124 may be rigidly connected with base 116. In some embodiments, retainer 124 may be directly connected with base 116. In the illustrated example, retainer lower end 196 is held rigidly in contact with base connecting portion 156 of base upper end 144 by fasteners 164.

Still referring to FIGS. 1, 2, 3A-3B, 4A-4B, and 5A-5B, retainer 124 may be shaped to surround at least a portion of rotor 120 when retainer 124 is connected to base 116. In the illustrated example, rotor 120 is positioned within the bounds of base bearing surface 152, and retainer 124 is connected to base connecting portion 156 which surrounds base bearing surface 152. In one aspect, this may permit retainer 124 to substantially inhibit relative horizontal movements between rotor 120 and base 116. In turn, this may substantially inhibit rotor 120 from moving outside the bounds of base bearing surface 152, and maintain the plane bearing formed by rotor 120 with base 116.

Preferably, retainer 124 substantially inhibits vertical movement of rotor 120 relative to base 116. In the illustrated example, retainer 124 is fastened to base 116 in overlapping relation to rotor 120. Thus, at least a portion of rotor 120 is positioned between retainer 124 and base 116. Sandwiching rotor 120 between retainer 124 and base 116 against relative vertical displacement may prevent rotor 120 and base 116 from becoming separated. Preferably, rotor bearing surface 188 is held in contact with base bearing surface 152. As used herein and in the claims, rotor bearing surface 188 is said to be held in contact with base bearing surface 152 even where manufacturing tolerances may permit minor relative vertical movement (e.g. less than 1 mm) between the surfaces 152 and 188.

Still referring to FIGS. 1, 2, 3A-3B, 4A-4B, and 5A-5B, rotor upper end 168 may include a first portion 204 and a second portion 208. As exemplified, first portion 204 may be connected to seat lower end 184, and second portion 208 may be overlapped by retainer 124. First and second portions 204 and 208 may be any two suitable different portions of rotor upper end 168. In the illustrated embodiment, rotor 120 comprises a central portion 212 including the upper end first portion 204, and a flange 216 including the upper end second portion 208. Flange 216 may surround central portion 212 and central portion 212 may extend above flange 216.

Upper end first portion 204 may extend above retainer upper end 192 for connecting upper end first portion 204 to seat 108. For example, retainer 124 may include an aperture 220 through retainer lower and upper ends 192 and 196 for providing a through passage for upper end first portion 204. As exemplified, rotor 120 central portion 212 may extend upwardly through aperture 220 and connect with seat 108. In some embodiments, this may permit seat lower end 184 to be spaced apart from retainer upper end 192 which may prevent frictional contact and wear that such contact might create. In alternative embodiment, seat lower end 184 may be in contact with retainer upper end 192.

Central portion 212 and aperture 220 may have any suitable sizes and shapes. Preferably, aperture 220 is sized to conform closely to the shape and size of central portion 212 as central portion 212 rotates with rotor 120. In the illustrated embodiment, central portion 212 and aperture 220 have circular cross-sectional shapes, and aperture 220 is nominally larger than central portion 212 to avoid a press-fit that might unduly hinder relative rotation between rotor 120 and base 116. This may help to impede the entry of dirt and liquid into furniture swivel 112 through the gap between central portion 212 and a periphery of aperture 220. Optionally, a sealing member (e.g. an O-ring, not shown) may seal central portion 212 within aperture 220. For example, the sealing member may be positioned inside aperture 220 surrounding central portion 212.

Still referring to FIGS. 1, 2, 3A-3B, 4A-4B, and 5A-5B, retainer lower end 196 may overlap second portion 208 of rotor upper end 168. In the illustrated embodiment, retainer lower end 196 includes an overlapping portion 224 and a connecting portion 228. Retainer overlapping portion 224 may overlap second portion 208 of rotor upper end 168, and retainer connecting portion 228 may be connected to base connecting portion 156 of base upper end 128. Preferably, retainer overlapping portion 224 is positioned outboard of retainer aperture 220, and retainer connecting portion 228 is outboard of overlapping portion 224. In the illustrated example, retainer overlapping portion 224 surrounds retainer aperture 220, and retainer connecting portion 228 surrounds retainer overlapping portion 224.

Second portion 208 of rotor upper end 168 and overlapping portion 224 of retainer lower end 196 may have any suitable sizes, shapes, and surface profiles. In the illustrated example, rotor second portion 208 forms part of an annular flange 216 which surrounds rotor central portion 212. As exemplified, rotor flange 216 may form a stepwise profile with rotor central portion 212, which may provide a flat, horizontal surface for second portion 208. In the illustrated example, retainer overlapping portion 224 is formed by a horizontal end wall of a bore 232 in retainer lower end 196. As shown, retainer bore 232 may extend from retainer lower end 196 vertically part-way toward retainer upper end 192. Retainer bore 232 may be sized to receive rotor flange 216 whereby rotor second portion 208 may be positioned face-to-face with retainer overlapping portion 224.

In some embodiments, rotor second portion 208 and retainer overlapping portion 224 may be held in contact with each other. It will be appreciated that manufacturing tolerances may provide for a small gap between rotor second portion 208 and retainer overlapping portion 224. For example, rotor bore depth 236 may be equal to or slightly larger than rotor flange thickness 240.

In some alternative embodiments, one or both of retainer overlapping portion 224 and rotor second portion 208 may be angled to horizontal. For example, rotor second portion 208 may form part of a sloped face which tapers from rotor lower end 172 toward rotor upper end 168. Similarly, retainer bore 232 may taper in width from retainer lower end 196 toward retainer upper end 192. In some alternative embodiments, one or both of retainer overlapping portion 224 and rotor second portion 208 may have a contoured surface profile instead of having a flat surface as in the example shown.

Retainer aperture 220, retainer bore 232, rotor central portion 212, and rotor flange 216 may have any suitable sizes and cross-sectional shapes. In the illustrated embodiment, retainer aperture 220, retainer bore 232, rotor central portion 212, and rotor flange 216 each have circular cross-sectional shapes. As shown, rotor central portion diameter 244 may be less than retainer aperture diameter 248, rotor flange diameter 252 may be less than retainer bore diameter 256, and retainer aperture diameter 248 may be less than retainer bore diameter 232. Further, the illustrated example shows that retainer aperture 220, retainer bore 232, rotor central portion 212, and rotor flange 216 may share a common central axis 260.

In some embodiments, at least a portion of furniture swivel 112 may be injection molded parts of plastic material. For example, at least a portion of one or more of base 116, rotor 120, and retainer 124 may be a plastic injection molded part. Preferably, base 116, rotor 120, and retainer 124 are made entirely of injection molded plastic. This may make furniture swivel 112 highly corrosion resistant for use in proximity to salt water (e.g. in furniture for boats, docks, and cottages). This may also make furniture swivel 112 easy and cost-effective to manufacture. Some features of base 116, rotor 120, and/or retainer 124 may be formed by other processes after injection molding. For example, some apertures or bores may be drilled, and some faces may be machined.

Base 116, rotor 120, and retainer 124 may be formed of any suitable plastic, such as high-density polyethylene (HDPE) for example. Preferably, the plastic material used is derived entirely from recycled plastic, and most preferably from post-consumer recycled plastic. Alternatively, the plastic material may be newly manufactured plastic. In some cases, the plastic material may include, in total, up to 10% of polypropylene, low-density polyethylene, re-grind (e.g. post-consumer polyethylene, or post-industrial polyethylene), and combinations thereof.

One or more additives may be incorporated into the plastic material. In some embodiments, the plastic material may include pigment for coloring the furniture swivel 112 (e.g. to match or compliment the furniture component(s) rotatably coupled by furniture swivel 112). In some embodiments, the plastic material may include a blowing agent to assist with the injection molding. In some embodiments, the plastic material may be impregnated with lubricant to reduce friction between rotor 120 and base 116. Suitable lubricants for impregnation may include synthetic grease (e.g. Mobil Mobilith SHC 460), or lithium grease.

Preferably, at least rotor bearing surface 188 and base bearing surface 152 are made of plastic. More preferably, bearing surfaces 188 and 152 are injection molded plastic surfaces. The remainder of rotor 120 and base 116 may be made of any suitable material whether plastic or another material.

Figure 6:
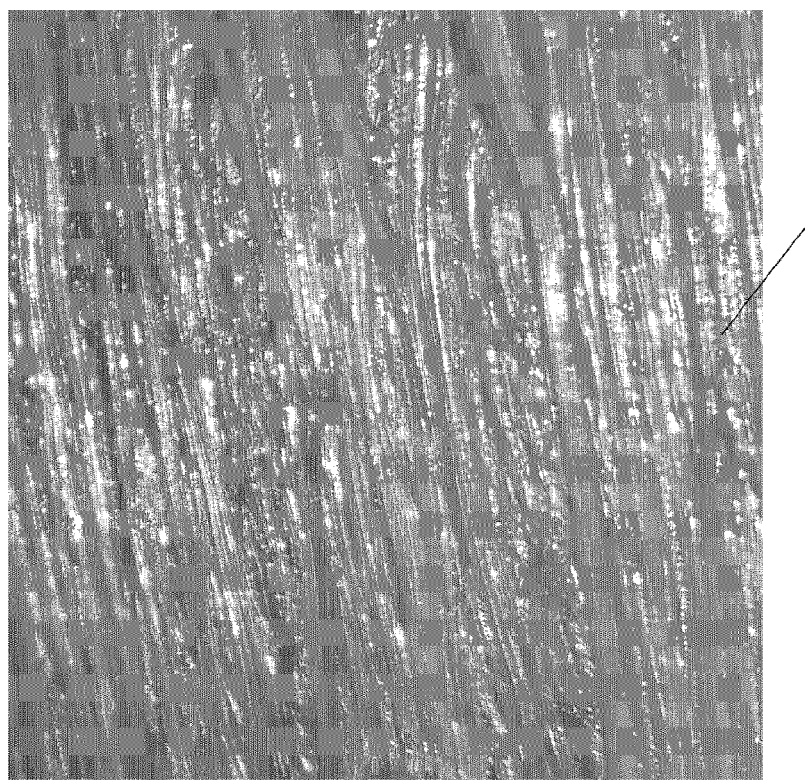
FIG. 6 is a photograph of a surface grain.

In some embodiments, injection molding may impart a surface grain (i.e. macroscopic surface texture) to bearing surfaces 188 and 152. For example, FIG. 6 shows a surface grain 190 that may be imparted to bearing surfaces 188 and 152. The surface grain of bearing surfaces 188 and 152 may reduce the Percent Contact Area of the plane bearing formed by bearing surfaces 188 and 152. As used herein and in the claims, Percent Contact Area is calculated by formula (1):

$$\text{Percentage Contact Area} = \frac{\text{Area of Physical Contact (cm}^2)}{\text{Bulk Plane Bearing Area (cm}^2)} \times 100\% \quad (1)$$

As used in formula (1), Bulk Plane Bearing Area is the bulk area of overlap between bearing surfaces 188 and 152 providing, in combination, a plane bearing. Area of Physical Contact is the sum total area of physical contact points between bearing surfaces 188 and 152 in the plane bearing.

Figure 7A:
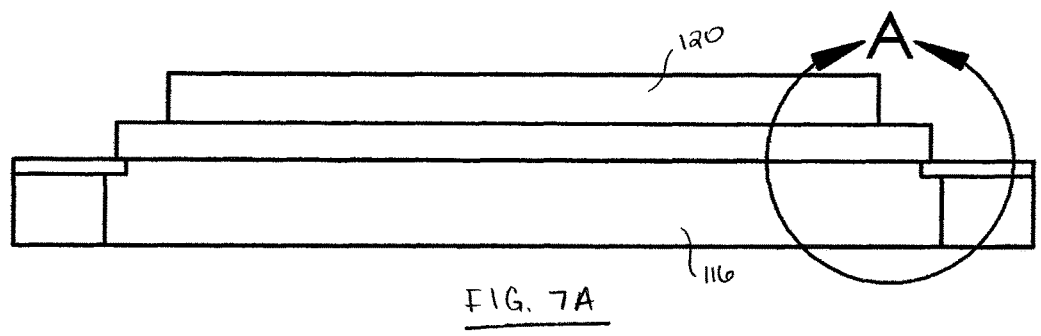
FIG. 7A is a side view of a swivel rotor positioned on a swivel base.
Figure 7B:
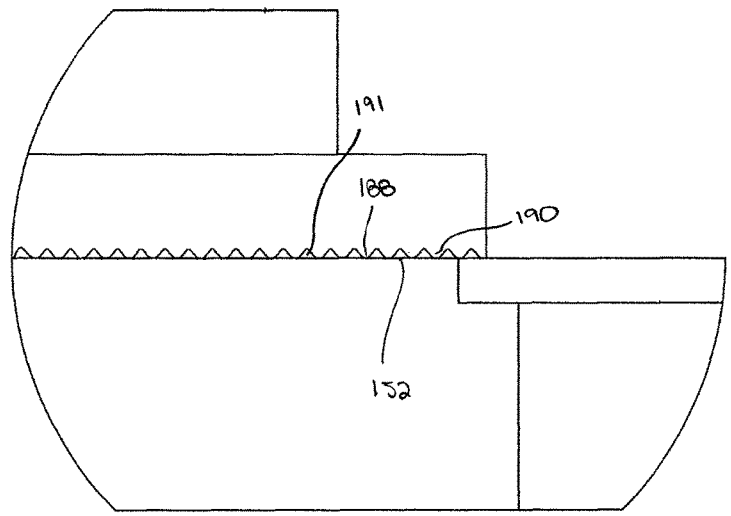
FIG. 7B is an enlargement of region A in FIG. 7A.

FIG. 7A shows swivel rotor 120 positioned on swivel base 116. FIG. 7B is a partial enlargement of FIG. 7A to show bearing surfaces 188 and 152. In the illustrated example, base bearing surface 152 is smooth and rotor bearing surface 188 has surface grain 190. In alternative embodiments, both bearing surfaces 188 and 152 may have a surface grain 190, or just base bearing surface 152 may have surface grain 190. As shown, the grain 190 of bearing surface(s) 188 and/or 152 may cause bearing surfaces 188 and 152 to make intermitted contact within the plane bearing area, thus having a Percent Contact Area of less than 100%. In contrast, perfectly smooth flat bearing surfaces 188 and 152 would make contiguous contact at every point in the plane bearing, and thus have a Percent Contact Area of 100%

A lower Percent Contact Area means less physical contact between bearing surfaces 188 and 152, which in some cases may contribute to lower frictional resistance against rotation of rotor 120 on base 116. Preferably, the Percent Contact Area of the plane bearing of bearing surfaces 188 and 152 is less than 80%, more preferably less than 65%, and most preferably less than 50%. In some embodiments, the Percent Contact Area of the plane bearing of bearing surfaces 188 and 152 may be 30-95%, more preferably 30-65%, and most preferably 30-50%. In the illustrated example of FIG. 7B, the Percentage Contact Area is approximately 45%.

In some embodiments, a suitable lubricant may be applied between rotor 120 and base 116. For example, lubricant may be applied to one or both of bearing surfaces 188 and 152. Suitable lubricants may include synthetic grease (e.g. Mobil Mobilith SHC 460), or lithium grease. The lubricant may help to reduce friction between bearing surfaces 152 and 188. When applied to bearing surfaces 152 or 188 having a surface grain 190, the lubricant may be captured in recessed pockets 191 formed where bearing surfaces 152 and 188 are spaced apart from each other. This may help to contain the lubricant between bearing surfaces 152 and 188, which may reduce the frequency at which lubricant must be reapplied between bearing surfaces 152 and 188, or eliminate the need for lubricant reapplications altogether.

Referring again to FIGS. 1, 2, 3A-3B, 4A-4B, and 5A-5B, in some embodiments, retainer 124 may form a seal with base 116, the seal surrounding at least a portion of rotor 120. For example, where retainer 124 and base 116 are made of plastic and connected by mechanical fasteners, base upper end 128 and retainer lower end 196 may deform under pressure to form a substantially liquid-tight seal. In the illustrated embodiment, connecting portions 156 and 228 of base 116 and retainer 124 may be pressed together by fasteners 164 with sufficient compressive force to cause the plastic material in connecting portions 156 and 228 to comply, sealing connecting portions 156 and 228 together. This may help to prevent entry of dirt and liquid into furniture swivel 112. This may also help to keep any lubricant that may be applied between rotor 120 and base 116 from escaping.

In some embodiments, base 116 may be rested in contact with a horizontal surface instead of being connected to a furniture component. For example, rotor 120 may be connected to a first furniture component, and base 116 may be placed on a horizontal surface to permit the furniture component to rotate relative to the horizontal surface (and base 116).

Figure 8A:
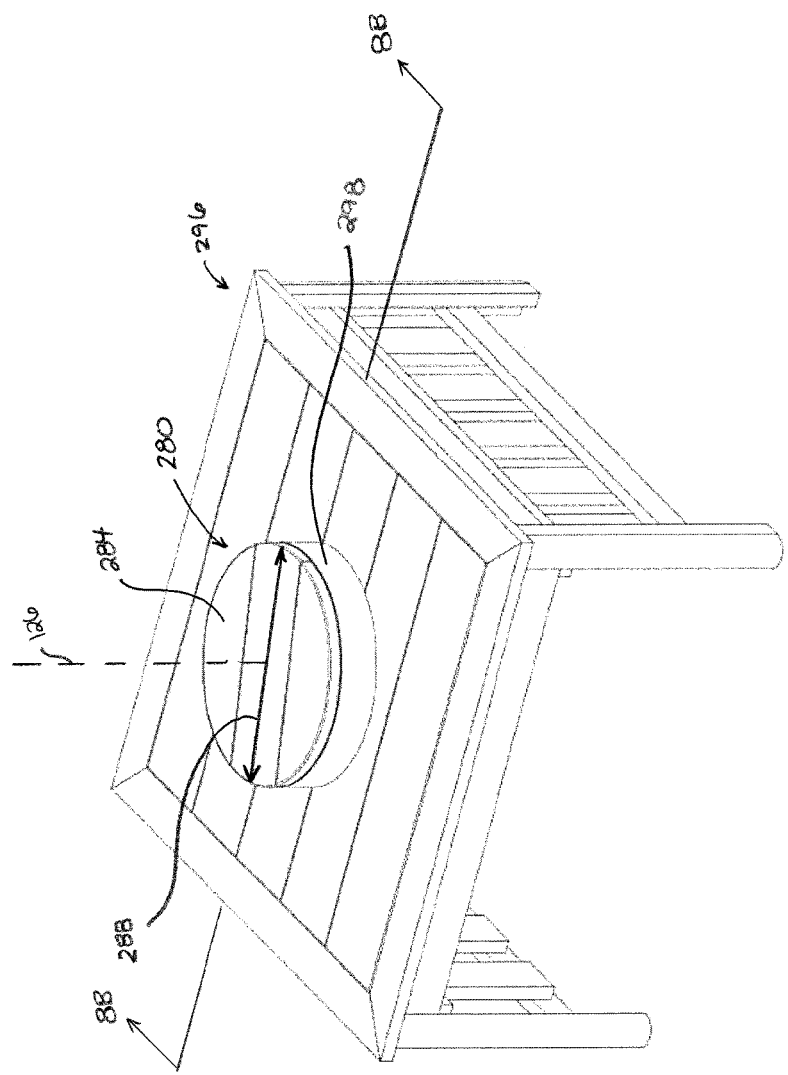
FIG. 8A is a perspective view of a turntable positioned on a table.
Figure 8B:
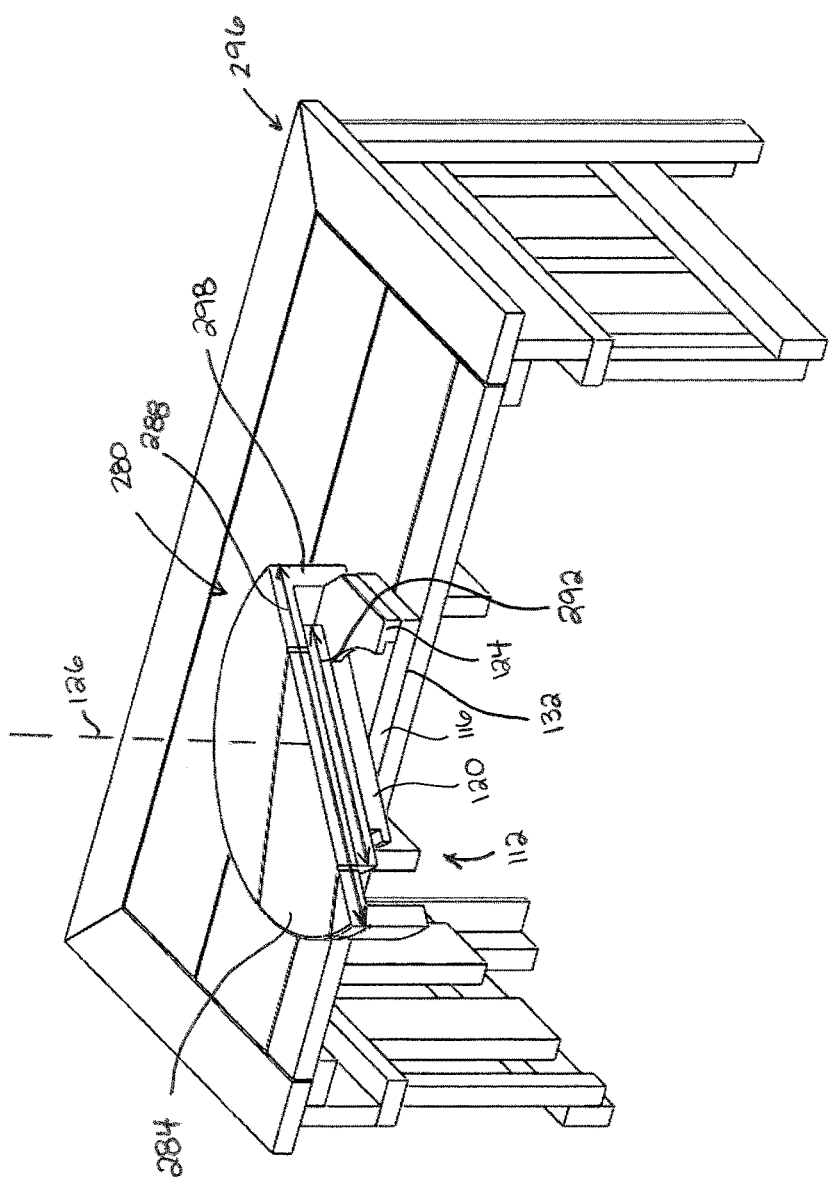
FIG. 8B is a cross-sectional view taken along line 8B-8B in FIG. 8A, with the turntable rotated against the section plane.

Reference is now made to FIGS. 8A and 8B which show a turntable 280 on a table 296 in accordance with at least one embodiment. As exemplified, turntable 280 may include furniture swivel 112 and tabletop 284. Tabletop 284 may be connected to rotor 120, and base lower end 132 may be selectively rested on a horizontal surface (such as table 296, as shown) to permit tabletop 284 to rotate with respect to base 120 and the horizontal surface (e.g. as in a lazy-susan) about axis 126 of rotation normal to the horizontal surface. For example, base lower end 132 may rest in contact with the horizontal surface, or base lower end 132 may be connected to one or more supports (e.g. feet, legs, or a monolithic post), which may support base lower end 132 for resting on the horizontal surface.

Preferably, a width 288 of tabletop 284 is greater than a width 292 of furniture swivel 112. In some cases, this may permit tabletop 284 to hide furniture swivel 112 from view. In some embodiments, a skirt 298 may be connected to tabletop 284 and extend downwardly to hide swivel 112. In some embodiments, tabletop 284 may be transparent whereby furniture swivel 112 may be clearly visible.

Tabletop 284 may be connected to rotor 120 in any suitable fashion such as by mechanical fasteners (e.g. screws, rivets, nails, or press-fit dowels), adhesives (e.g. glue or epoxy), an interference fit, threads, or by integrally forming tabletop 284 with rotor 120 for example. Tabletop 284 may be rigidly connected to rotor 120. In some embodiments, tabletop 284 is directly connected to rotor 120.

Figure 9A:
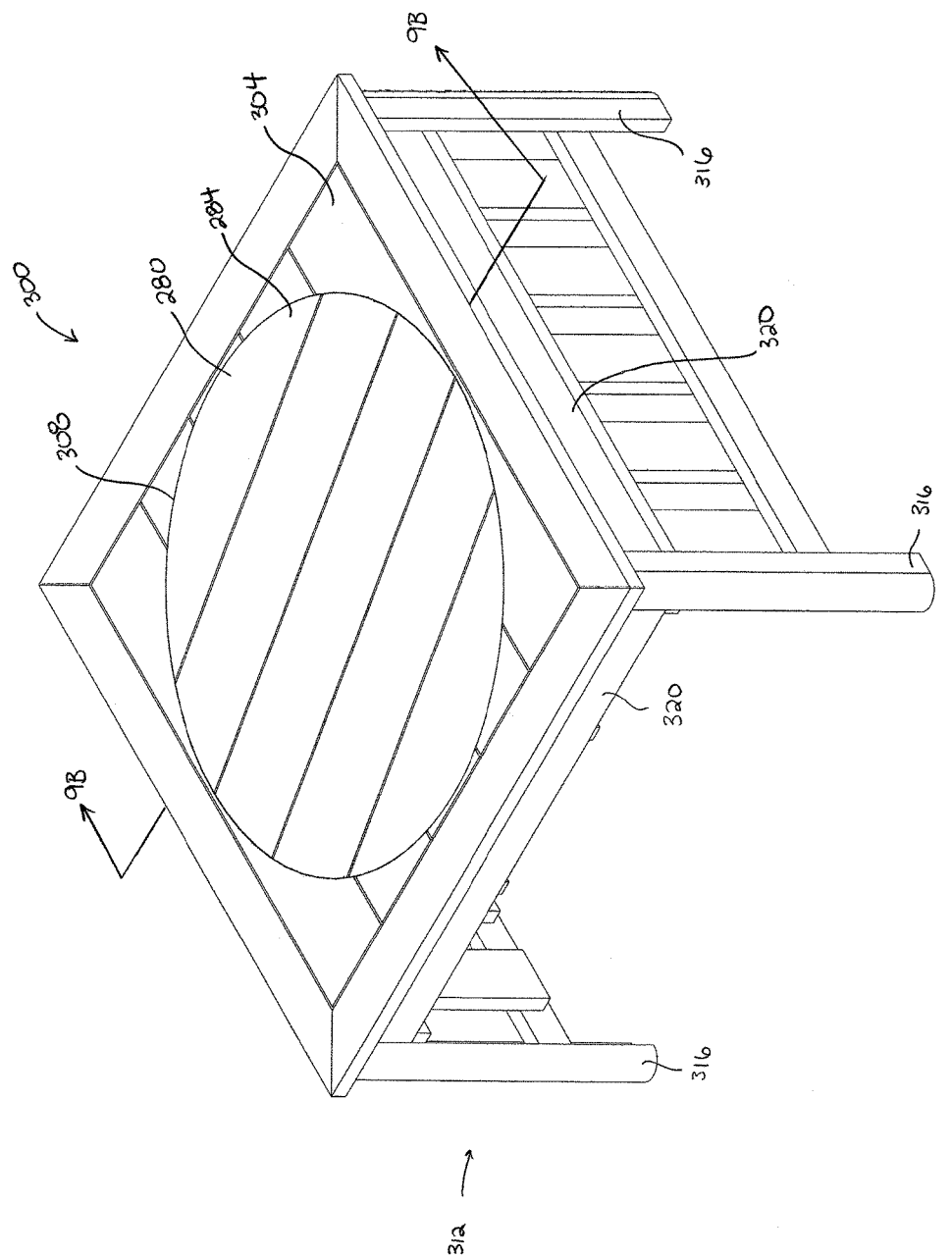
FIG. 9A is a perspective view of a table incorporating a turntable.
Figure 9B:
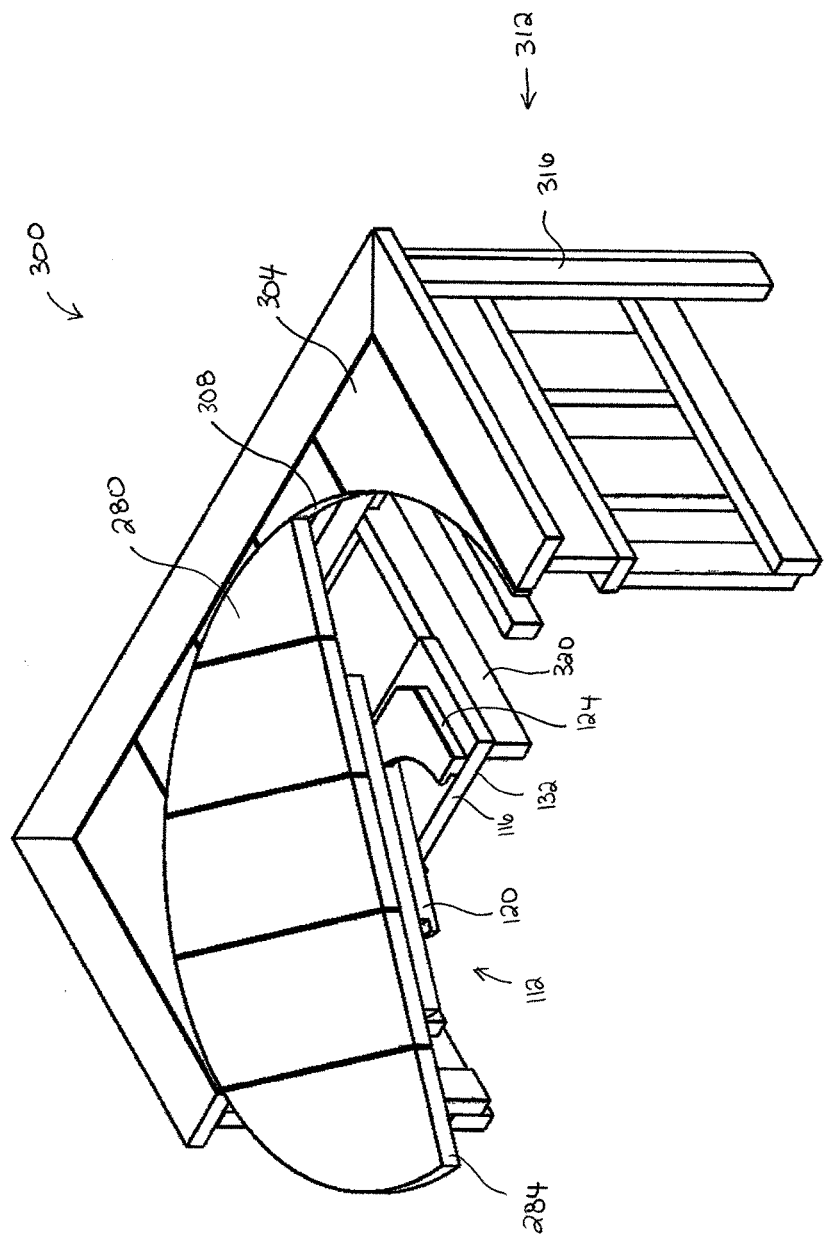
FIG. 9B is a cross-sectional view taken along line 9B-9B in FIG. 9A, with the turntable rotated against the section plane.

Reference is now made to FIGS. 9A and 9B. In some embodiments, turntable 280 may be integrated into a tabletop 304 of a table 300. For example, tabletop 304 may include a tabletop opening 308, and turntable 280 may be positioned in the tabletop opening 308. As exemplified, table 300 may include supports 312 for carrying tabletop 304 and turntable 280 above a surface below (e.g. a floor or ground surface). Supports 312 may take any suitable form. In the illustrated embodiment, supports 312 include legs 316 and framing 320. As shown, legs 316 may be oriented (e.g. vertically) to contact the surface below, and framing 320 may extend traversely (e.g. horizontally) to legs 316 to provide support for tabletop 304 and turntable 280 between legs 316. In the illustrated example, tabletop 304 and base lower end 132 are connected to framing 320 in a suitable manner (e.g. by mechanical fasteners (e.g. screws, rivets, nails, or press-fit dowels), adhesives (e.g. glue or epoxy), an interference fit, threads, or by integrally forming with framing 320 for example), and framing 320 is connected to legs 316.

Turntable tabletop 284 may be level, recessed, or protruding from table tabletop 304. For example, tabletop 284 may extend above tabletop 304, or tabletop 284 may be recessed below tabletop 304. In the illustrated example, tabletop 284 is substantially level with tabletop 304. Also, as shown, tabletop opening 308 and tabletop 284 may be circular in shape, and have substantially the same diameter (e.g. leaving only a small clearance gap). This may permit tabletops 284 and 304 to form a substantially continuous tabletop with a rotatable central portion.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A furniture swivel for rotatably coupling first and second furniture components, the furniture swivel comprising:
 a base configured to connect to a first furniture component, the base having a base upper end with a planar base bearing surface,
 a rotor configured to connect to a second furniture component, the rotor having a rotor lower end including a planar rotor bearing surface in sliding contact with the base bearing surface to form a plane bearing absent rolling elements; and
 a retainer coupled to the base, the retainer having an aperture, the rotor extending into the aperture, and the retainer overlapping the rotor to substantially inhibit translation of the rotor relative to the base.

2. The furniture swivel of claim 1, wherein at least the base bearing surface and the rotor bearing surface are made of plastic to form a plastic-on-plastic plane bearing.

3. The furniture swivel of claim 2, wherein one or both of the base bearing surface and the rotor bearing surface has a surface grain which provides the plane bearing with a Percent Contact Area of less than 80%.

4. The furniture swivel of claim 3, wherein a surface roughness of the one or both of the base bearing surface and the rotor bearing surface is formed by injection molding.

5. The furniture swivel of claim 3, further comprising lubricant between the base and rotor bearing surfaces.

6. The furniture swivel of claim 2, wherein one or both of the base bearing surface and the rotor bearing surface has a surface grain which provides the plane bearing with a Percent Contact Area of less than 65%.

7. The furniture swivel of claim 2, wherein one or both of the base bearing surface and the rotor bearing surface is made of plastic impregnated with lubricant.

8. The furniture swivel of claim 1, wherein:
 the rotor comprises a central portion and a flange,
  the flange surrounding the central portion,
  the central portion extending above the flange.

9. The furniture swivel of claim 8, wherein:
 the central portion of the rotor extends through the aperture in the retainer,
 the retainer further comprises a bore, and
 the flange is received in the bore.

10. The furniture swivel of claim 9, wherein:
 the central portion, the flange, the aperture, and the bore are circular in cross-section.

11. The furniture swivel of claim 10, wherein:
 both of a diameter of the central portion and a diameter of the aperture are less than both of a diameter of the flange and a diameter of bore, and axes of the central portion, the flange, the aperture, and the bore are collinear.

12. The furniture swivel of claim 1, wherein:
 the retainer forms a seal with the base, the seal surrounding rotor.

13. The furniture swivel of claim 12, wherein:
 the retainer is made of plastic, the base is made of plastic, the retainer is fastened to the base by a plurality of mechanical fasteners, and the seal is formed by compliance of the retainer plastic and the base plastic where the retainer is pressed against the base.

14. The furniture swivel of claim 1, wherein:
 the base lower end further comprises at least one depression for seating an end of the first furniture component, and at least one aperture aligned with each depression for receiving a fastener.

15. The furniture swivel of claim 1, further comprising:
 the first furniture component integrally formed with the base.

16. The furniture swivel of claim 1, further comprising:
 the second furniture component integrally formed with the rotor.

17. A furniture swivel for rotatably coupling first and second furniture components, the furniture swivel comprising:
 a base having a base first end opposite a base second end, the base second end configured to connect to a first furniture component, the base first end including a base bearing surface,
 a rotor having a rotor first end opposite a rotor second end, the rotor first end having a first portion and a second portion,
  the first portion configured to connect to a second furniture component, the rotor second end including a rotor bearing surface, the base bearing surface and rotor bearing surface together forming a plane bearing absent rolling elements; and
 a retainer coupled to the base, the retainer having a retainer first end opposite a retainer second end, the retainer second end overlapping the second portion of the rotor first end to substantially inhibiting translation of the rotor relative to the base, the retainer forming a seal with the base, the seal surrounding the rotor.

18. The furniture swivel of claim 17, wherein:
 the retainer is made of plastic, the base is made of plastic, the retainer is fastened to the base by a plurality of mechanical fasteners, and the seal is formed by compliance of the retainer plastic and the base plastic where the retainer is pressed against the base.

19. A furniture swivel for rotatably coupling first and second furniture components, the furniture swivel comprising:
 a base having a base upper end opposite a base lower end, the base lower end configured to connect to a first furniture component, the base upper end including a planar base bearing surface,
 a rotor having a rotor upper end opposite a rotor lower end, the rotor upper end having a central portion and a flange portion surrounding the central portion,
  the central portion configured to connect to a second furniture component, the rotor lower end including a planar rotor bearing surface in sliding contact with the base bearing surface to form a plane bearing absent rolling elements; and
 a retainer coupled to the base, the retainer having a retainer upper end opposite a retainer lower end, an aperture through the retainer upper and lower ends, and a bore extending from the retainer lower end toward the retainer upper end, the central portion of the rotor upper end extending through the aperture in the retainer, the flange portion of the rotor upper end received in the bore, the retainer lower end overlapping the flange portion of the rotor upper end to substantially inhibit translation of the rotor relative to the base, and axes of the central portion, the flange, the aperture, and the bore are collinear.

* * * * *